(12) United States Patent
Kohlberger et al.

(10) Patent No.: US 9,269,939 B2
(45) Date of Patent: Feb. 23, 2016

(54) INSULATING DEVICE AND METHOD FOR PRODUCING AN INSULATING DEVICE

(75) Inventors: Markus Kohlberger, Stuttgart (DE); Michael Moser, Rainau (DE)

(73) Assignee: MAHLE International GmbH, Stuttgart (DE)

( * ) Notice: Subject to any disclaimer, the term of this patent is extended or adjusted under 35 U.S.C. 154(b) by 959 days.

(21) Appl. No.: 13/427,049

(22) Filed: Mar. 22, 2012

(65) Prior Publication Data

US 2012/0241138 A1 Sep. 27, 2012

Related U.S. Application Data

(63) Continuation of application No. PCT/EP2010/063965, filed on Sep. 22, 2010.

(30) Foreign Application Priority Data

Sep. 22, 2009 (DE) .......................... 10 2009 042 270

(51) Int. Cl.
*H01M 10/653* (2014.01)
*H01M 2/20* (2006.01)
*H01M 2/34* (2006.01)
*H01M 10/6556* (2014.01)
(Continued)

(52) U.S. Cl.
CPC ................ *H01M 2/202* (2013.01); *H01M 2/34* (2013.01); *H01M 10/613* (2015.04); *H01M 10/653* (2015.04); *H01M 10/6556* (2015.04); *H01M 2/1016* (2013.01); *H01M 10/625* (2015.04); *H01M 10/6553* (2015.04); *Y10T 29/4935* (2015.01)

(58) Field of Classification Search
CPC ............ H01M 10/613; H01M 10/625; H01M 10/653; H01M 10/654; H01M 10/6554; H01M 10/6551; H01M 10/6553; H01M 10/6556; H01M 2/22; H01M 2/34; H01M 2/202; H01M 2/1016; Y10T 29/4935
USPC ......................................................... 165/185
See application file for complete search history.

(56) References Cited

U.S. PATENT DOCUMENTS 5,382,480 A * 1/1995 Molyneux ...................... 429/120
6,146,786 A * 11/2000 Stadnick et al. ............... 429/101
(Continued)

FOREIGN PATENT DOCUMENTS

DE 10 2007 010745 A1 8/2008
DE 10 2007 031674 A1 1/2009
(Continued)

*Primary Examiner* — Tho V Duong
(74) *Attorney, Agent, or Firm* — Muncy, Geissler, Olds & Lowe, P.C.

(57) ABSTRACT

An insulating device for an electrochemical energy storage unit is provided, wherein the insulating device includes a cooling plate that comprises at least one opening. A contact rail is provided for dissipating heat and a retaining element for fixing an arrangement between the cooling plate and the contact rail and has a shaft extending through the opening of the cooling plate, and a first intermediate space is defined by a distance between a wall of the opening and the shaft and/or a second intermediate space is defined by a distance between an edge of the contact rail and the shaft. A connecting element having a surface including an electrically insulating material is disposed between a main surface of the cooling plate and a surface of the contact rail, and a partial region thereof protrudes into the first and/or the second intermediate space.

3 Claims, 4 Drawing Sheets

(51) Int. Cl.
*H01M 10/613* (2014.01)
*H01M 10/625* (2014.01)
*H01M 2/10* (2006.01)
*H01M 10/6553* (2014.01)

(56) References Cited

U.S. PATENT DOCUMENTS

| | | | |
|---|---|---|---|
| 7,119,143 B2* | 10/2006 | Jarnjevic et al. | 524/588 |
| 7,862,925 B2* | 1/2011 | Kim | 429/94 |
| 7,960,055 B2* | 6/2011 | Uh | 429/180 |
| 2005/0026014 A1 | 2/2005 | Fogaing et al. | |
| 2006/0099504 A1* | 5/2006 | Kim | 429/176 |
| 2008/0171235 A1* | 7/2008 | Seo et al. | 429/7 |
| 2010/0104936 A1 | 4/2010 | Meintschel et al. | |

FOREIGN PATENT DOCUMENTS

| | | |
|---|---|---|
| DE | 10 2007 063178 A1 | 6/2009 |
| EP | 2 026 387 A1 | 2/2009 |
| JP | 2001 076696 A | 3/2001 |
| JP | 2005 317456 A | 11/2005 |
| WO | WO 2009/006998 A1 | 1/2009 |

* cited by examiner

Prior Art

INSULATING DEVICE AND METHOD FOR PRODUCING AN INSULATING DEVICE

This nonprovisional application is a continuation of International Application No. PCT/EP2010/063965, which was filed on Sep. 22, 2010, and which claims priority to German Patent Application No. DE 10 2009 042 270.6, which was filed in Germany on Sep. 22, 2009, and which are both herein incorporated by reference.

BACKGROUND OF THE INVENTION

1. Field of the Invention

The present invention relates to an insulating device for an electrochemical energy storage unit and to a method for producing an insulating device for an electrochemical energy storage unit.

2. Description of the Background Art

In the case of batteries for hybrid and electric vehicles, a large number of galvanic cells are connected in series to achieve a higher voltage. Such batteries can be called electrochemical energy storage cells, whereby accumulators, also used in hybrid and electric vehicles, can be understood as covered by this term as well. Because of the high currents which then flow through such electrochemical energy storage cells and the resulting high heat, cooling of the electrochemical energy storage cells is needed in addition.

In the conventional art, there are various cooling options for such problems such as, for example, air cooling, liquid cooling, direct cooling via an air conditioning unit (AC=air conditioning), and possibly also combinations thereof.

The cooling can be thermally connected via surfaces of the electrochemical energy storage cells or via thermal arresters, as is disclosed, for example, in the patent publications WO 2009/006998 A1 or in EP 2 026 387 A1. A principal approach for connecting a cooling plate to a contact bar according to the state of the art is furthermore shown in FIG. 1. In this case, rivet pins 1 as the retaining member are guided through an opening of cooling plate 2 and at least one contact bar 4, whereby cooling plate 2 is electrically insulated from contact bars 4 by a thermally conductive film 3.

It is problematic in the solutions according to the conventional art, however, that the air cooling requires considerable installation space and such air cooling has limitations further also with respect to possible soiling and thermal dissipation performance. When the cells are connected via the surfaces of the cooling plate, the thermal resistances worsen the heat transfer and thereby the heat dissipation rate. Cooling of arresters makes it possible to remove heat directly from the cells, but in the case of a cooling approach of this kind reliable electrical insulation should be assured. At the same time, the thermal connection should be as good as possible; i.e., there should be as low a thermal resistance as possible between contact bar 4 and cooling plate 2.

SUMMARY OF THE INVENTION

It is therefore an object of the present invention to provide an improved insulating device for an electrochemical energy storage unit and an improved method for producing an insulating device for an electrochemical energy storage unit.

The present invention provides an insulating device for an electrochemical energy storage unit, whereby the insulation unit has the following features: a cooling plate, designed for thermal contacting with the electrochemical energy storage unit, whereby the cooling plate has at least one opening; a contact bar designed for dissipating heat; a retaining element for fixing an arrangement between the cooling plate and the contact bar, whereby the retaining element has a shaft extending through the opening of the cooling plate and whereby a first interspace is defined by a distance between a wall of the opening and the shaft and/or a second interspace is defined by a distance between an edge of the contact bar and the shaft; and a connecting element having a surface, which has an electrically insulating material, whereby the connecting element is disposed between a main surface of the cooling plate and a surface of the contact bar and further has a partial region projecting into the first and/or the second interspace.

The present invention provides furthermore a method for producing an insulating device for an electrochemical energy storage unit, whereby the method comprises the following steps: providing a cooling plate, designed for thermal contacting with the electrochemical energy storage unit, whereby the cooling plate has at least one opening; providing a contact bar designed for dissipating heat; disposing a connecting element having a surface, which has an electrically insulating material, between a main surface of the cooling plate and a surface of the contact bar in such a way that a partial region of the connecting element projects into the opening of the cooling plate and/or covers an edge of the contact bar laterally; and attaching a retaining element for fixing an arrangement between the cooling plate and the contact bar, whereby the retaining element has a shaft, which during the attachment is inserted through the opening of the cooling plate, so that the partial region of the connecting element is disposed between the shaft and a wall of the opening and/or between the edge of the contact bar and the shaft.

In an embodiment, the present invention is based on the realization that a considerable increase or lengthening of a path of possible leakage currents from the cooling plate to the contact bar is achieved by providing a partial region of an electrically insulating connecting element in an interspace between a shaft of a retaining element and a wall of an opening in a cooling plate or between the shaft of the retaining element and the edge of the contact bar.

An improvement of the electrical insulation between the cooling plate and the contact bar can be achieved by such lengthening of an electrical path of possible leakage currents. In so doing, according to a first embodiment of the invention, the corresponding partial region can project only into the interspace between the shaft of the retaining element and a wall of the opening of the cooling plate. In a second embodiment of the invention, the partial region of the connecting element can project only into an interspace between the shaft of the retaining element and the edge of the contact bar. In a third embodiment of the invention, in contrast, the partial region of the connecting element can project both into the interspace between the shaft of the retaining element and the wall of the opening and also into the interspace between the edge of the contact bar and the shaft of the retaining element.

The connecting element, which is to be fabricated preferably from electrically insulating material or is to have an electrically insulating material at least on the surface, can therefore also be understood to be an insulating element. In particular, the partial region of the connecting element, which projects into the corresponding interspaces between the wall of the opening or the edge of the contact bar and the shaft, in this case is to have a surface made of an electrically insulating material, to have as high an electrical resistance against leakage currents as possible on its surface. Providing the retaining element can assure further a secure fixing of the contact bar to the cooling plate.

According to an embodiment of the invention, the contact bar can be a separate element. Alternatively, it is also possible, however, that the arresters of the electrochemical energy storage unit form the contact bar.

The present invention offers the advantage that a significant lengthening of a path of possible leakage currents between the cooling plate and the contact bar can be achieved by simple structural measures. In so doing, further, a compact structural form of the insulating device can be assured, so that a high electrical insulation in a spatial area with small dimensions can also be assured.

In an embodiment of the invention, the connecting element can be designed to provide a flush closure of the opening of the cooling plate in conjunction with the shaft. Such an embodiment of the present invention offers the advantage that a lengthening, to be created, of a path of possible leakage currents is maximized, whereby at the same time the flush closing of the opening of the cooling plate on two opposing main surfaces is possible. This reduces a possible tendency for soiling in the area of the opening, because no depressions form in this area in which possibly conductive particles can settle, which in turn would cause a worsening of the electrical insulation.

In another embodiment of the invention, the connecting element can be formed by a thermally conductive film or a silicone molded part. Such an embodiment of the present invention offers the advantage of a simple manufacturing option, by which production costs can be reduced.

Further, it is also beneficial if the connecting element comprises an element filled with boron nitride or aluminum oxide and made of polyurethane or silicone. Such an embodiment of the present invention offers very good electrical insulating behavior and at the same time, however, also enables a high heat exchange ability of the connecting element.

According to an embodiment of the invention, the connecting element can have a thermally conductive film and at least one insulating element inserted into the thermally conductive film and projecting into the first and/or second interspace, whereby the insulating element can be formed by a plastic bushing, a silicone or polyether polyurethane round element, or a silicone or polyether polyurethane round disc. Such an embodiment of the present invention also enables a very simple and thereby cost-effective production option for the connecting element, whereby at the same time the insulating element can form the electrical highly insulating partial region, which projects into the first and/or second interspace. A very cost-effective insulating device can therefore be produced by the technically very simple assembly of such a connecting element from the thermally conductive film and the insulating element.

In another embodiment of the invention, the insulating element can have an insulating shaft, which extends along the shaft, whereby the insulating shaft has a form which tapers proceeding from a main surface of the cooling plate with increasing (penetration) depth into the opening of the cooling plate. Such an embodiment of the present invention offers the advantage of a very simple mounting option in the assembly of the insulating device from the cooling plate, the contact bar, and the connecting element to be disposed therebetween.

Further, in another embodiment of the invention, the connecting element can also comprise a laminated thermally conductive film, which has at least two different film layers, whereby at least one of the film layers projects into the first and/or second interspace. Such an embodiment of the present invention offers the advantage of a connecting element that is simple to produce and is made of the laminated thermally conductive film, in which during assembly of the insulating device one of the film layers can be pressed very simply into the first and/or second interspace. The connecting element with the indicated partial region in the first and/or second interspace can be formed very simply and cost-effectively in this way.

To make certain that a film layer can be pressed into the interspace between the wall of the opening or the edge of the contact bar and the shaft of the retaining element, according to another embodiment of the invention, the first layer has a film opening with a first diameter and the second layer a film opening with a second diameter different from the first diameter, whereby the shaft extends through the first and second film opening. As a result, during insertion of the retaining element the film layer with the smaller opening is pressed into an interspace between the wall of the opening and the shaft or between the edge of the contact bar and the shaft, particularly if the smaller opening has a diameter smaller than a cross section of the shaft.

To achieve as good a heat transfer as possible between the contact bar and the cooling plate, a large supporting surface between the contact bar and the connecting element and between the connecting element and the cooling plate should be achieved. This can be achieved advantageously in that the connecting element comprises a laminated thermally conductive film, which has at least two different film layers, whereby a first layer of the two film layers has a first opening with a smaller diameter and the second of the two film layers has an opening with a larger diameter, and whereby the insulating element is pushed through the first and second film opening and an insulating element head fills the larger film opening and closes it flush with the main surface of the thermally conductive film.

According to another embodiment of the invention, the contact bar can also have at least one opening, through which the shaft of the retaining element projects, whereby the one edge of the contact bar, which forms a boundary of the second interspace, represents an edge of the opening of the contact bar. This type of embodiment of the present invention advantageously offers the option of assuring a stable and strong fixing between the contact bar and the cooling plate and at the same time of enabling a high electrical insulation between the contact bar and the cooling plate.

To avoid a work step if possible, in which a thermally conductive plate or the connecting element in general must be poured into a form, which would then have to be cured and fitted between the contact bar and the cooling plate, in a special embodiment of the invention in the step of providing the cooling plate, a main surface of the cooling plate can be coated with a liquid material and further the cooling plate coated with the liquid material can be heated to produce the connecting element. In so doing, a wall of an opening in the cooling plate can also be coated with the sealing compound, so that the aforementioned partial region of the connecting element can also be formed in the step of providing the cooling plate.

An especially good electrical insulating ability with good thermal conductivity of the insulating device is obtained, if in the step of providing the cooling plate a main surface is coated with a ceramic-filled silicone sealing compound.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of the exemplary embodiments of the present invention, the same or similar reference numbers are used for elements with a similar action and shown in the different drawings, whereby a repeated description of these elements is omitted. The described exemplary embodiments are selected only by way of example and can be combined with one another. If an exemplary embodiment includes an "and/or" conjunction between a first feature/step and a second feature/step, then this can be read such that the exemplary embodiment according to one embodiment has both the first feature/the first step and the second feature/the second step and according to another embodiment either only the first feature/step or only the second feature/step.

Figure 1:
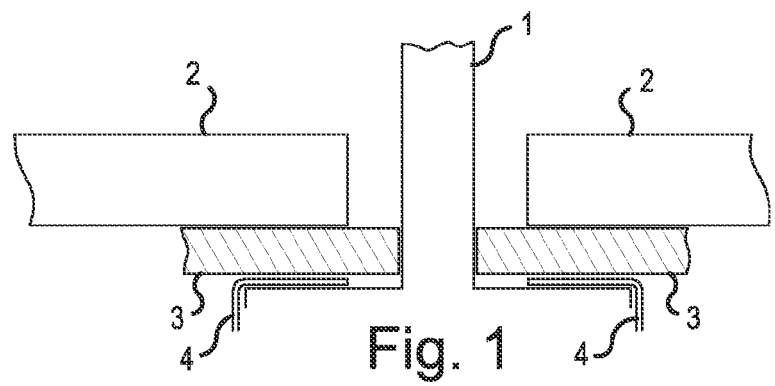
FIG. 1 is a cross-sectional illustration of an insulating device according to the state of the art.
Figure 2:
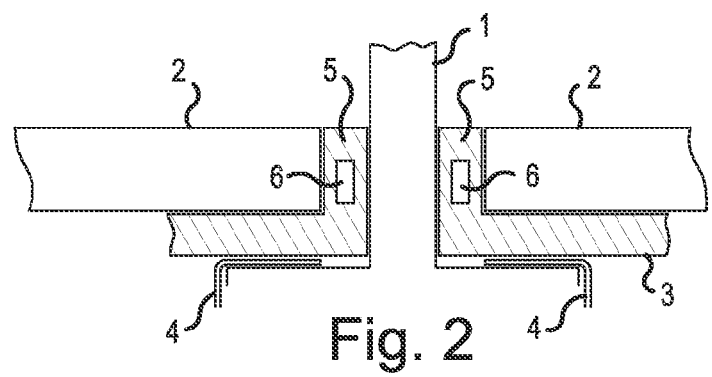
FIG. 2 is a cross-sectional illustration of an insulating device according to an exemplary embodiment of the present invention.

FIG. 2 shows a cross-sectional illustration of an insulating device according to an exemplary embodiment of the present invention. In comparison with the illustration of FIG. 1, it is now evident that according to a first exemplary embodiment of the invention, connecting element 3, which is formed here as a thermally conductive film, has a partial region 5, which projects into the opening of the cooling plate between a shaft of the retaining element (i.e., of the rivet pin 1). The thermally conductive film or a silicone molded part 3 as the connecting element is thereby shaped such that it surrounds the edge(s) of the feed-through hole (i.e., the opening) in cooling plate 2 for rivet pin 1 as the retaining element in cooling plate 2. The surface of partial region 5 of connecting element 3 in this case should include an electrically insulating material. A lengthening of the path of possible leakage currents between cooling plate 2 and contact bar 4, compared with approaches according to the state of the art, can be achieved in this way. In the state of the art (according to FIG. 1), namely a leakage current could take a short path from a lower corner of the cooling plate around the edges of thermally conductive film 3 in the area of the opening of thermally conductive film 3 at rivet pin 1 to contact bar 4. If, however, the connecting element according to FIG. 2 has a partial region 5, which projects into the interspace between a wall of the opening of cooling plate 2 and shaft 1 of the retaining element, the path of a possible leakage current is lengthened and as a result the electrical insulation between contact bar 4 and cooling plate 2 is improved.

Therefore, the leakage distance from contact bar 4 to cooling plate 2 can be considerably lengthened and thereby the electrical insulation behavior of the insulating device improved by the approach proposed here. The thermally conductive film 3 as a connecting element in the present case is, for example, a material filled with boron nitride or aluminum oxide and made of polyether polyurethane or silicone. Alternatively, a thermally conductive film 3 can be provided with additional insulating elements 6 (plastic bushings, silicone/PU round elements/discs) or have a two-part (e.g., laminated) structure, which projects into the feed-through hole of cooling plate 2, as shown in FIG. 2.

Figure 3:
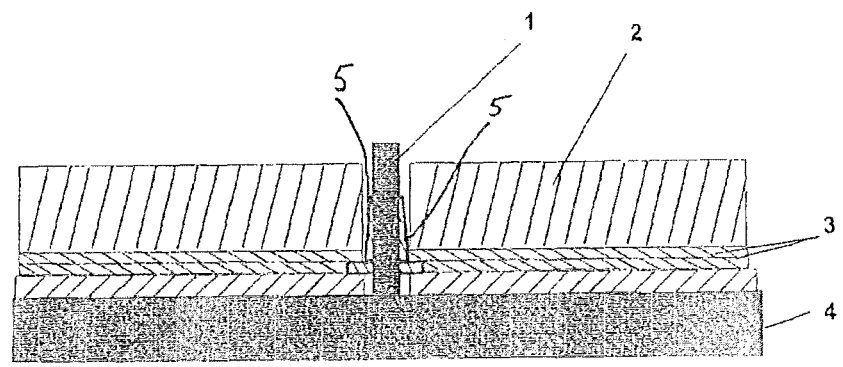
FIG. 3 is a cross-sectional illustration of an insulating device according to another exemplary embodiment of the present invention.

A two- or multi-part structure of thermally conductive film 3, used as an example, can have in addition different diameters of the feed-through holes (openings) in the individual layers (i.e., film layers). It is therefore possible to insert the aforementioned insulating elements between contact bar 4 and cooling plate 2 in the thermally conductive film so that all edges of contact bar 4 are covered and nonetheless no thickness differences arise. As a result, a uniform attachment of thermally conductive film 3 to cooling plate 2 is assured, as is evident from FIG. 3.

Figure 4:
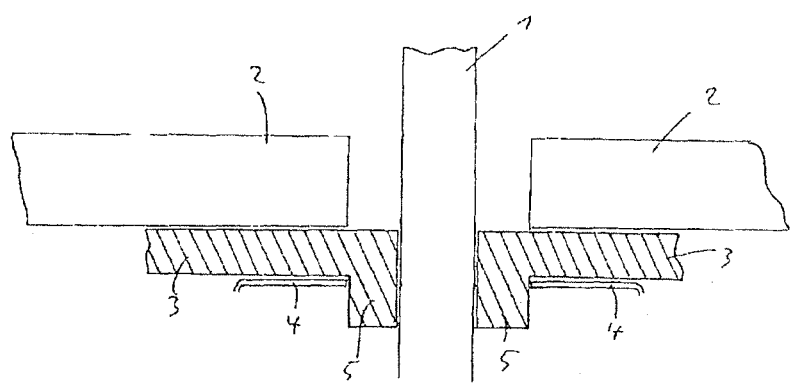
FIG. 4 is a cross-sectional illustration of an insulating device according to another exemplary embodiment of the present invention.

Alternatively, also the edge(s) of contact bar 4 can be surrounded by a partial region 5 of connecting element 3, as shown by way of example in FIG. 4. In this case, partial region 5 of connecting element 3 no longer projects into the (first) interspace between a wall of the opening of cooling plate 2 and shaft 1, but into a (second) interspace between contact bar 4 and shaft 1. This type of arrangement as well of partial region 5 of connecting element 3 causes a lengthening of a path of a possible leakage current between contact bar 4 and cooling plate 2.

Figure 5A:
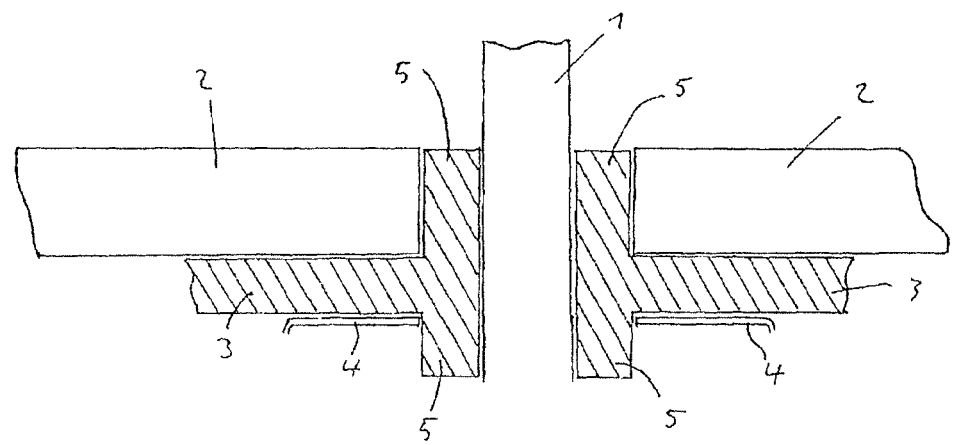
FIG. 5A is a cross-sectional illustration of an insulating device according to another exemplary embodiment of the present invention.

Another exemplary embodiment of the invention can also be obtained by a combination of the exemplary embodiments according to FIGS. 2 and 4, as is illustrated in FIG. 5A. In such an exemplary embodiment, both edges, i.e., the edge(s) of the opening in cooling plate 2 and the edge(s) of contact bar 4 are surrounded or enclosed by the partial region 5 of connecting element 3. A possible leakage current between cooling plate 2 and contact bar 4 would then have to travel a still farther path, as a result of which there would be further improvement of the electrical insulation behavior of an insulating device designed in this way.

The distance of the enclosed area, i.e., the depth to which partial region 5 of connecting element 3 projects into an interspace between a wall of the opening in cooling plate 2 and shaft 1 or into an interspace between the edge of contact bar 4 and shaft 1, can be varied, as a result of which an electrical insulation of different size between contact bar 4 and cooling plate 2 can be achieved. This makes it possible to adjust the insulating behavior, as a function of a depth to which partial region 5 projects into the corresponding interspaces. Other embodiments, which, however, would lead to a more space-intensive packaging, could be seen in realizations in bars and cooling plates, which, however, would need to be made correspondingly large to maintain the minimum leakage and air gap distance.

Figure 5B:
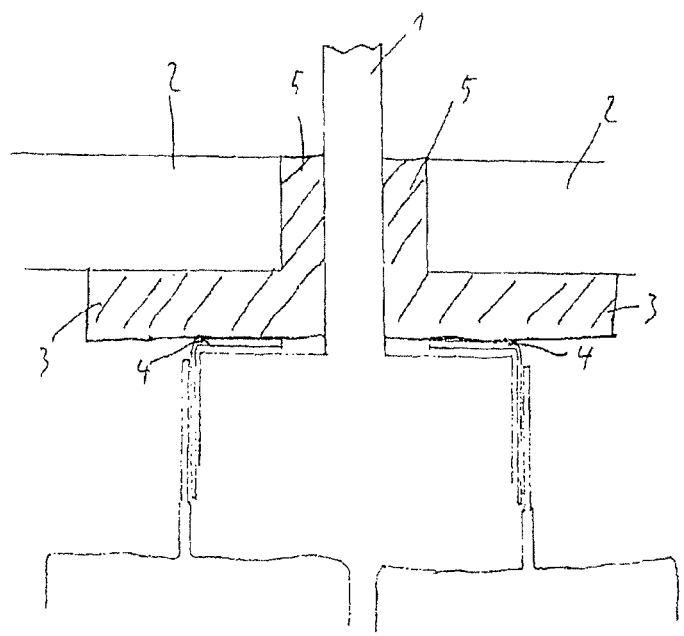
FIG. 5B is a cross-sectional illustration of an insulating device according to another exemplary embodiment of the present invention, whereby now the electrochemical energy storage elements are connected thermally to at least one contact bar.

FIG. 5B shows a thermal connection of electrochemical energy storage cells to contact bars 4. The electrochemical energy storage cells in this case are shown at the bottom in FIG. 5B and connected with arresters to contact bars 4.

Figure 6:
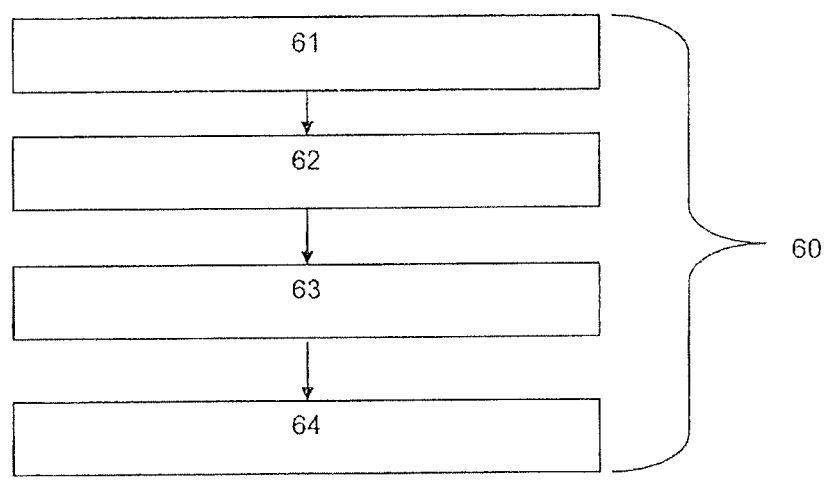
FIG. 6 is a flowchart of an exemplary embodiment of the present invention as a method.

FIG. 6 shows a flowchart of an exemplary embodiment of the present invention as a method 60 for producing an insulating device for an electrochemical energy storage unit. The method comprises a step of providing 61 a cooling plate, designed for thermal contacting with the electrochemical energy storage unit, whereby the cooling plate has at least one opening. Further, the method 60 comprises a step of providing 62 a contact bar, designed for dissipating heat. The method also comprises a step of disposing 63 a connecting element having a surface, which has an electrically insulating material, whereby the connecting element is disposed between a main surface of the cooling plate and a surface of the contact bar in such a way that a partial region of the connecting element projects into the opening of the cooling plate and/or covers an edge of the contact bar laterally. Finally, the method 60 has a step of attaching 64 a retaining element for fixing an arrangement between the cooling plate and the contact bar, whereby the retaining element has a shaft, which during the attachment is inserted through the opening of the cooling plate, so that the partial region of the connecting element is disposed between the shaft and a wall of the opening and/or between the edge of the contact bar and the shaft.

Furthermore, the cooling plate can also be coated with a still liquid matrix of a thermally conductive film (e.g., ceramic-filled silicone sealing compound). The finished coated plate is then placed in the oven for curing the compound. This saves the work step that the film must first be poured into a form, cured, and then glued to the plate.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An insulating device for an electrochemical energy storage unit, the insulating device comprising:

a cooling plate configured for thermal contacting with the electrochemical energy storage unit, the cooling plate having at least one opening;

a contact bar adapted to dissipate heat;

a retaining element for fixing an arrangement between the cooling plate and the contact bar, the retaining element having a shaft extending through the opening of the cooling plate, a first interspace being defined by a distance between a wall of the opening and the shaft and/or a second interspace being defined by a distance between an edge of the contact bar and the shaft; and a connecting element having a surface, which has an electrically insulating material, the connecting element being arranged between a main surface of the cooling plate and a surface of the contact bar, and further has a partial region projecting into the first and/or the second interspace, wherein the contact bar has at least one opening, through which the shaft of the retaining element projects and wherein the one edge of the contact bar, which forms the second interspace, represents an edge of the opening of the contact bar, and wherein the connecting element has a thermally conductive film and at least one insulating element inserted into the partial region of the thermally conductive film that projects into the first and/or second interspace, the insulating element being formed by a plastic bushing, a silicone or polyether polyurethane round element, or a silicone or polyether polyurethane round disc.

2. The insulating device according to claim 1, wherein the connecting element is configured to close off flush the opening of the cooling plate in conjunction with the shaft.

3. The insulating device according to claim 1, wherein the connecting element and the partial region are a single, uniform structure.

* * * * *